(12) United States Patent
Sakai

(10) Patent No.: US 12,114,104 B2
(45) Date of Patent: *Oct. 8, 2024

(54) CONTROL DEVICE, AND CONTROL METHOD

(71) Applicant: SEIKO EPSON CORPORATION, Tokyo (JP)

(72) Inventor: Toshiyuki Sakai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 149 days.

This patent is subject to a terminal disclaimer.

(21) Appl. No.: 17/983,530

(22) Filed: Nov. 9, 2022

(65) Prior Publication Data

US 2023/0070178 A1  Mar. 9, 2023

Related U.S. Application Data

(63) Continuation of application No. 17/559,312, filed on Dec. 22, 2021, now Pat. No. 11,528,455, which is a
(Continued)

(30) Foreign Application Priority Data

Oct. 18, 2017 (JP) ................................ 2017-201611

(51) Int. Cl.
  *H04N 9/31* (2006.01)
  *G06F 3/048* (2013.01)
  *H04N 5/66* (2006.01)

(52) U.S. Cl.
  CPC ............ *H04N 9/3105* (2013.01); *H04N 5/66* (2013.01); *H04N 9/3132* (2013.01);
  (Continued)

(58) Field of Classification Search
  CPC .. H04N 9/3179; H04N 9/3105; H04N 9/3191; H04N 9/3132; H04N 9/3164; H04N 9/66; H04N 9/3147; G06F 3/048
  See application file for complete search history.

(56) References Cited

U.S. PATENT DOCUMENTS

2005/0225669 A1*  10/2005  Tsai ..................... H04N 9/3147
                                                                    345/1.3
2008/0136976 A1   6/2008   Ajito et al.
(Continued)

FOREIGN PATENT DOCUMENTS

JP    H10-254665 A    9/1998
JP    2010-003077 A   1/2010
(Continued)

*Primary Examiner* — Nitin Patel
*Assistant Examiner* — Cory A Almeida
(74) *Attorney, Agent, or Firm* — Oliff PLC

(57) ABSTRACT

An information processing device which controls one projector and another projector includes: a display unit which displays a first operation screen for managing the one projector and a second operation screen for managing the another projector; an input unit which accepts an operation on the first operation screen and the second operation screen; and a control unit which controls the one projector and the another projector, based on the operation accepted by the input unit. When the information processing device is switched from a first state where the first operation screen is operable to a second state where the second operation screen is operable, the control unit causes the second operation screen where an item corresponding to a predetermined item selected on the first operation screen in the first state is selected, to be displayed in the second state.

22 Claims, 9 Drawing Sheets

Related U.S. Application Data continuation of application No. 16/162,879, filed on Oct. 17, 2018, now Pat. No. 11,245,879.

(52) U.S. Cl.
CPC ......... *H04N 9/3147* (2013.01); *H04N 9/3164* (2013.01); *H04N 9/3179* (2013.01); *H04N 9/3191* (2013.01); *G06F 3/048* (2013.01)

(56) References Cited

U.S. PATENT DOCUMENTS

| | | | | |
|---|---|---|---|---|
| 2010/0195145 A1* | 8/2010 | Adachi | .............. | H04N 1/00222 |
| | | | | 358/1.15 |
| 2012/0206745 A1* | 8/2012 | Shibuya | ............... | H04N 1/6033 |
| | | | | 358/1.9 |
| 2015/0301767 A1* | 10/2015 | Morita | .................. | G06F 3/1205 |
| | | | | 358/1.13 |
| 2019/0116356 A1 | 4/2019 | Matoba et al. | | |

FOREIGN PATENT DOCUMENTS

| | | | |
|---|---|---|---|
| JP | 2010-161467 | A | 7/2010 |
| JP | 2012-169866 | A | 9/2012 |
| JP | 2014-107713 | A | 6/2014 |
| JP | 2014-127915 | A | 7/2014 |
| JP | 2015-207117 | A | 11/2015 |
| JP | 2015-230648 | A | 12/2015 |
| WO | 2006/025191 | A1 | 3/2006 |

\* cited by examiner

CONTROL DEVICE, AND CONTROL METHOD

PRIORITY AND CROSS-REFERENCE

This application is a continuation application of U.S. Application Ser. No. 17/559,312, filed Dec. 22, 2021, which is in turn a continuation application of U.S. application Ser. No. 16/162,879, filed Oct. 17, 2018, which claims priority to Japanese Patent Application No. 2017-201611, filed Oct. 18, 2017. The entire disclosures of each application are expressly incorporated by reference herein.

BACKGROUND

1. Technical Field

The present invention relates to a control device, a control method, and a control program.

2. Related Art

As disclosed in JP-A-2015-230648, a system in which one control device such as a personal computer controls a plurality of display devices such as projectors is known. In such a system, the personal computer displays setting screens for controlling a plurality of projectors, on a display unit. The user can operate the displayed setting screens to achieve desired settings.

However, the setting screens for controlling a plurality of projectors are independent from one projector to another. Therefore, the user needs to select and switch to a setting screen for each projector to be controlled, and achieve a desired setting on each setting screen thus switched. The operation of setting each projector is complicated and takes time and effort, resulting in poor user-friendliness.

SUMMARY

An advantage of some aspects of the invention is that a control device that can easily switch setting screens for projectors is provided.

The invention can be implemented as the following forms or application examples.

Appication Example 1

A control device according to this application example is a control device which controls a first display device and a second display device. The control device includes: a display unit which displays a first management screen for managing the first display device and a second management screen for managing the second display device; an input unit which accepts an operation on the first management screen and the second management screen; and a control unit which controls the first display device and the second display device, based on the operation accepted by the input unit. When the control device is switched from a first state where the first management screen is operable to a second state where the second management screen is operable, the control unit causes the display unit to display the second management screen where an item corresponding to a predetermined item selected on the first management screen in the first state is selected, in the second state.

With such a configuration, when the control device is switched from the first state, where the first management screen is operable, to the second state, where the second management screen is operable, the second management screen where an item corresponding to a predetermined item selected on the first management screen in the first state is selected is displayed in the second state. Since the item corresponding to the predetermined item selected on the first management screen is selected on the second management screen, the predetermined item can be swiftly managed for the first display device and the second display device. This improves convenience in managing the display devices.

Appication Example 2

In the control device according to the above application example, the predetermined item may be included in a first item screen selected on the first management screen in the first state.

Appication Example 3

In the control device according to the above application example, it is preferable that the control unit causes a second item screen that is the same as the first item screen to be selected on the second management screen in the second state.

With such a configuration, the second management screen where a second item screen that is the same as the first item screen selected on the first management screen in the first state is selected is displayed in the second state. Thus, when the display device to be managed is switched, the same item screen is displayed. This saves the time and effort of selecting an item screen every time the display device is switched.

Appication Example 4

In the control device according to the above application example, the control unit may set an item on the second item screen to an initial value when causing the second item screen to be selected on the second management screen.

Appication Example 5

In the control device according to the above application example, the control unit may decide an item on the second item screen, based on a setting state of the second display device, when causing the second item screen to be selected on the second management screen.

Appication Example 6

In the control device according to the above application example, it is preferable that the control unit decides whether to select the item corresponding to the predetermined item or not, based on a setting switch.

With such a configuration, when the control device is switched from the first state to the second state, an item displayed on the management screen can be decided according to the setting switch.

Appication Example 7

A control method according to this application example is a control method for controlling a first display device and a second display device. The method includes: displaying a first management screen for managing the first display device and a second management screen for managing the second display device; determining whether there is a switching from a first state where the first management screen is operable to a second state where the second management screen is operable; selecting an item corresponding to a predetermined item selected on the first management screen in the first state, on the second management screen, if a switching from the first state to the second state is determined; and displaying the second management screen in an operable manner.

With such a method, when there is a switching from the first state, where the first management screen is operable, to the second state, where the second management screen is operable, the second management screen where an item corresponding to a predetermined item selected on the first management screen in the first state is selected is displayed in the second state. Since the item corresponding to the predetermined item selected on the first management screen is selected on the second management screen, the predetermined item can be swiftly managed for the first display device and the second display device. This improves convenience in managing the display devices.

Appication Example 8

A control program according to this application example is a control program for controlling a first display device and a second display device. The program causes a computer to execute: a function of displaying a first management screen for managing the first display device and a second management screen for managing the second display device; a function of determining whether there is a switching from a first state where the first management screen is operable to a second state where the second management screen is operable; a function of selecting an item corresponding to a predetermined item selected on the first management screen in the first state, on the second management screen, if a switching from the first state to the second state is determined; and a function of displaying the second management screen in an operable manner.

With such a configuration, when there is a switching from the first state, where the first management screen is operable, to the second state, where the second management screen is operable, the second management screen where an item corresponding to a predetermined item selected on the first management screen in the first state is selected is displayed in the second state. Since the item corresponding to the predetermined item selected on the first management screen is selected on the second management screen, the predetermined item can be swiftly managed for the first display device and the second display device. This improves convenience in managing the display devices.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Embodiment

A control device according to an embodiment will be described below, with reference to the drawings.

Figure 1:
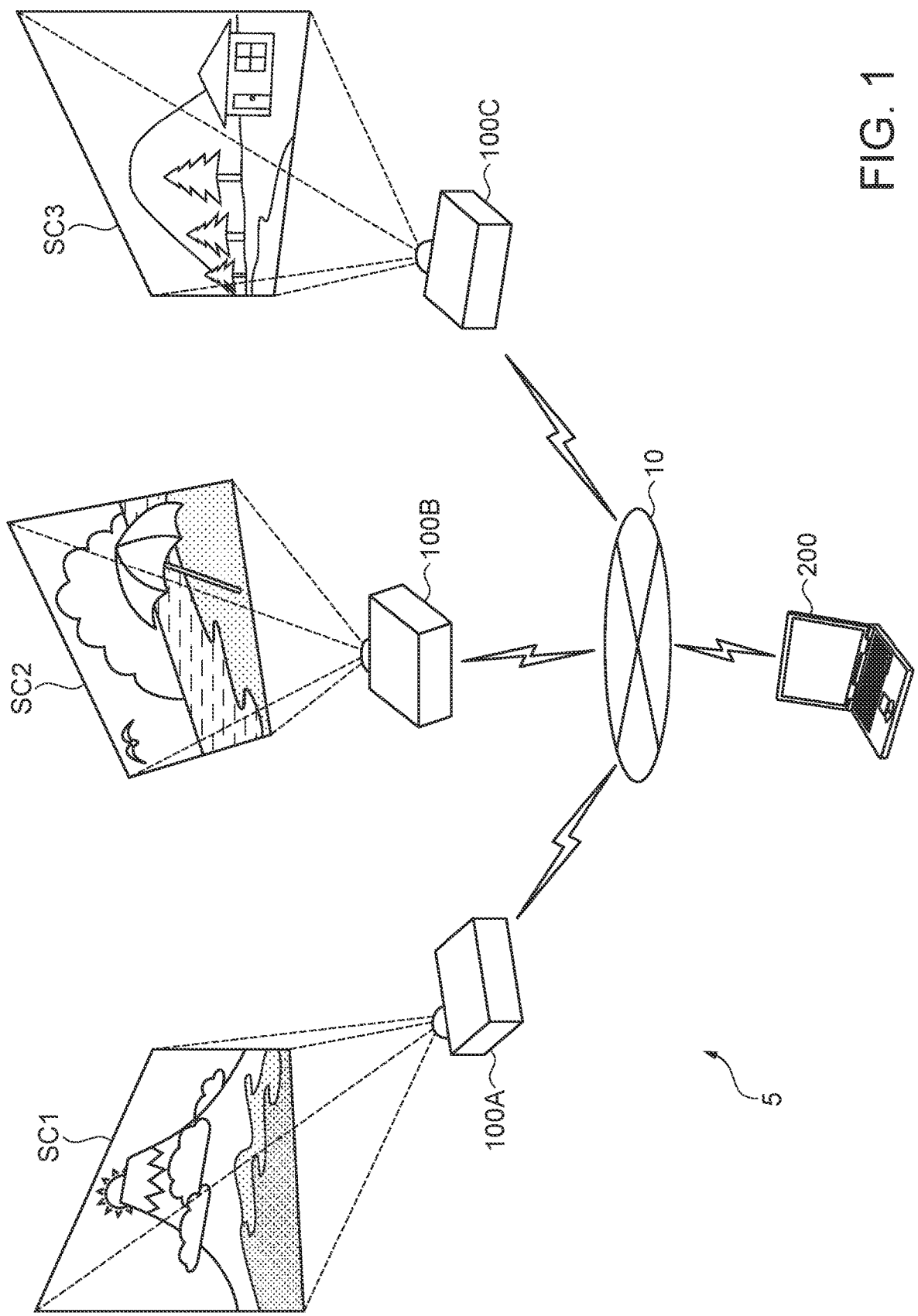
FIG. 1 shows an outline of a projection system.

FIG. 1 shows an outline of a projection system 5.

In the projection system 5, an information processing device 200 equivalent to a control device, and a plurality of projectors (100A, 100B, 100C) equivalent to display devices are connected to each other according to the protocol of a predetermined wireless communication method and can communicate with each other via a network 10.

The information processing device 200 can provide projection settings to achieve settings for projection and can supply image data to be projected, or the like, to each of the projectors (100A, 100B, 100C). The projection settings include settings of focus adjustment, distortion correction, zoom setting, and lens shift adjustment or the like.

The projectors (100A, 100B, 100C) can project various images including dynamic images on respective screens (SC1, SC2, SC3), based on an instruction from the information processing device 200.

Functional Configuration of Projectors

In this embodiment, the projectors (100A, 100B, 100C) are assumed to be the same model. Therefore, the projector 100A is employed in the description below.

Figure 2:
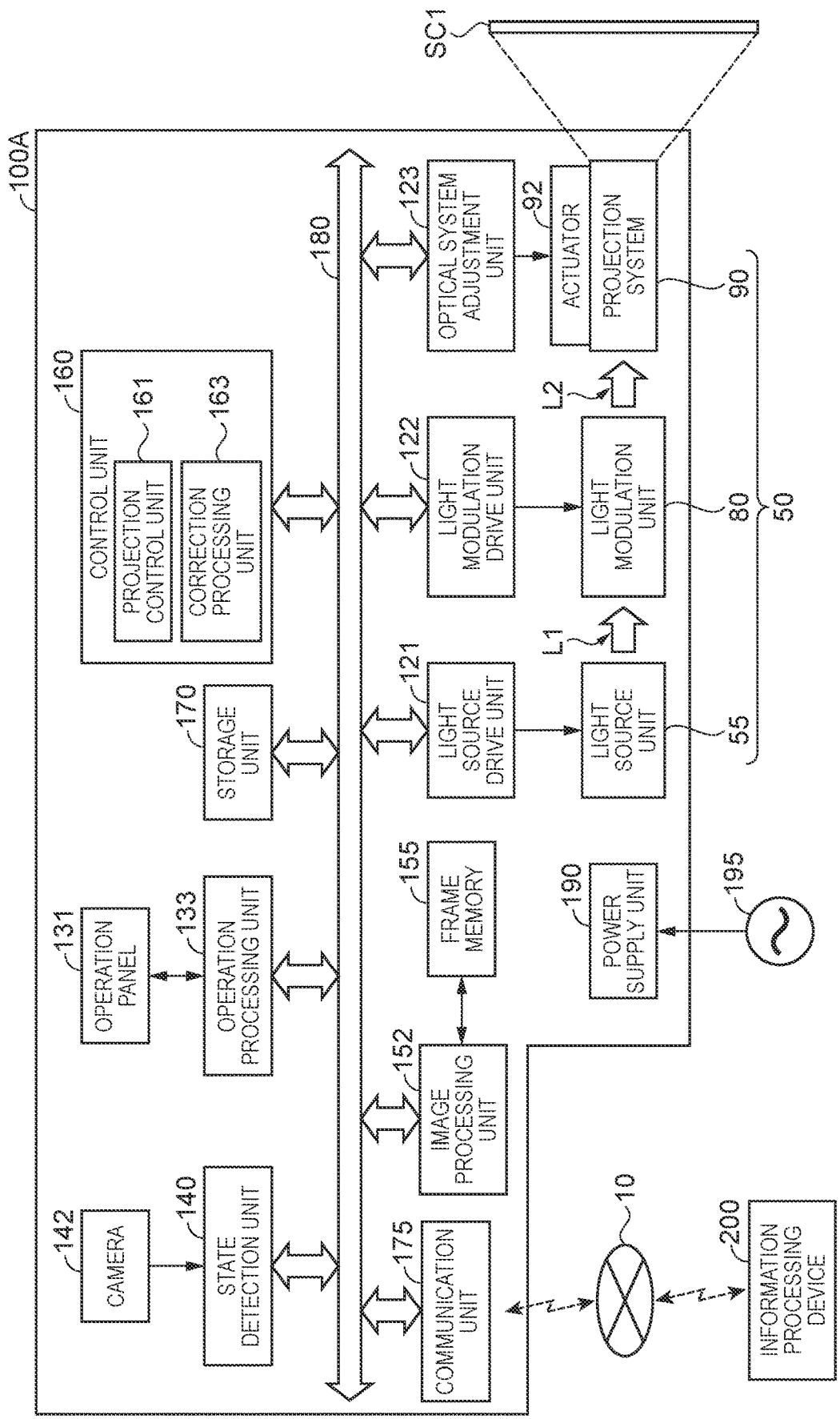
FIG. 2 shows the functional configuration of a projector.

FIG. 2 shows the functional configuration of the projector 100A.

The projector 100A has a communication unit 175. In this embodiment, the communication unit 175 has a communication interface compatible with a wireless LAN such as WiFi (trademark registered) or Bluetooth (trademark registered) and is connected to the information processing device 200 via the network 10.

The communication unit 175 may be connected via an Ethernet (trademark registered), IEEE 1394, HDMI (trademark registered), USB, or similar cable. The communication unit 175 may also be a communication device which functions based on the collaboration of a processor such as a CPU, a storage medium such as a RAM, and software (which are not illustrated).

The communication unit 175 receives projection settings and image data or the like from the connected information processing device 200. The communication unit 175 sends the received data of projection settings to a control unit 160. The communication unit 175 sends the received image data to an image processing unit 152.

The communication unit 175 can also transmit various kinds of information data to the connected information processing device 200.

The projector 100A has an image projection unit 50 which forms an optical image and projects (displays) the image on the screen SC1. The image projection unit 50 has a light source unit 55 as a light source, a light modulation unit 80, and a projection system 90.

The light source unit 55 is driven by a light source drive unit 121. The light source drive unit 121 is connected to an internal bus 180. The light source drive unit 121 switches on and off the light source of the light source unit 55 under the control of the control unit 160. When the light source is switched on, emission light L1 enters the light modulation unit 80.

The light modulation unit 80 modulates the light incident thereon from the light source unit 55 according to display image data. The emission light L1 from the light source unit 55 is modulated by the light modulation unit 80 into image light L2. The light modulation unit 80 has a liquid crystal light valve (not illustrated) including a liquid crystal panel made up of a pair of transparent substrates with a liquid crystal enclosed between them. The liquid crystal light valve has three liquid crystal panels corresponding to color light components of the primary colors of red (R), green (G), and blue (B). To the light modulation unit 80, a light modulation drive unit 122 which drives the light modulation unit 80 is connected. The light modulation drive unit 122 is connected to the internal bus 180.

The light modulation drive unit 122 generates each of R, G, B image signals based on display image data inputted from the image processing unit 152. Based on the generated R, G, B image signals, the light modulation drive unit 122 drives the corresponding liquid crystal panels (not illustrated) of the light modulation unit 80 and thus causes an image to be drawn.

The projection system 90 has a lens group which projects the image light L2 from the light modulation unit 80 into the direction of the screen SC1 and thus forms an image on the screen SC1. The projection system 90 also has a zoom mechanism which enlarges and reduces a projection image on the screen SC1 and adjusts its focal point, a focus adjustment mechanism which adjusts focusing, and a lens shift mechanism which moves the projection position on the screen SC1 in up, down, left, and right directions.

In this embodiment, the zoom mechanism, the focus adjustment mechanism, and the lens shift mechanism can be manually adjusted by the user and can also be adjusted by an actuator 92 made up of a motor and a gear or the like. For example, the actuator 92 converts the rotation of the motor into a linear movement by the gear or the like and thus moves at least a part of the lens group in the direction of the optical axis or in a direction orthogonal to the optical axis.

To the projection system 90, an optical system adjustment unit 123 is connected. The optical system adjustment unit 123 is connected to the internal bus 180.

The optical system adjustment unit 123 generates a drive signal for the actuator 92, based on an instruction sent from the control unit 160 according to focus adjustment, zoom setting, or lens shift adjustment or the like. The optical system adjustment unit 123 drives the actuator 92 of the projection system 90, based on the generated drive signal.

The projector 100A has an operation panel 131 and an operation processing unit 133. The operation processing unit 133 is connected to the internal bus 180.

On the operation panel 131, which accepts an operation from the user, various operation keys and display screens are displayed. When an operation key displayed on the operation panel 131 is operated, the operation processing unit 133 outputs data corresponding to the operated key to the control unit 160. The operation processing unit 133 also causes the operation panel 131 to display various screens under the control of the control unit 160.

A touch sensor which detects a touch on the operation panel 131 may be placed over and integrally formed with the operation panel 131. The operation processing unit 133 detects a position on the operation panel 131 touched by the user's finger or the like, as an input position, and outputs data corresponding to the detected input position to the control unit 160. The way of giving an operation instruction is not limited to inputting on the operation panel 131. For example, it is conceivable that an operation instruction is transmitted from a wireless remote controller or the like, not illustrated.

The projector 100A has a state detection unit 140. To the state detection unit 140, a signal outputted from a camera 142 built in the projector 100A is inputted.

The state detection unit 140 generates state information representing the state of the projector 100A, based on the inputted signal, and outputs the state information to the control unit 160.

The camera 142 has an image pickup optical system, an image pickup element such as a CCD, and an interface circuit or the like, and captures an image of peripheries of the screen SC where a projection image is projected, that is, an image in the direction of projection by the projection system 90. The camera 142 outputs an image data signal of the captured projection image to the state detection unit 140.

The projector 100A has an image processing system. The image processing system is made up mainly of the control unit 160, which comprehensively controls the entirety of the projector 100A. The image processing system also has the image processing unit 152, a frame memory 155, and a storage unit 170. The control unit 160, the image processing unit 152, and storage unit 170 are connected to the internal bus 180.

The image processing unit 152 loads image data inputted from the communication unit 175 into the frame memory 155, under the control of the control unit 160. The image processing unit 152 carries out shape correction processing such as keystone correction to correct a distortion, digital zoom processing, and processing such as adjustment of the color tone and brightness of the image, to the image data loaded in the frame memory 155. The image processing unit 152 executes processing designated by the control unit 160. The image processing unit 152 carries out processing, using a parameter inputted from the control unit 160, according to need. The image processing unit 152 can also execute a combination of a plurality of kinds of processing selected from the above.

The image processing unit 152 reads out the processed image data from the frame memory 155 and outputs this image data as display image data to the light modulation drive unit 122.

The control unit 160 has hardware including a processor such as a CPU (central processing unit), a ROM (read only memory), and a RAM (random access memory), none of which is illustrated. The ROM is a non-volatile storage device such as a flash ROM and stores a control program and data. The RAM forms a work area for the processor. The processor loads the control program read out from the ROM or the storage unit 170 into the RAM and executes the control program loaded in the RAM, thus implementing each functional unit of the projector 100A and comprehensively controlling operations of the projector 100A.

The control unit 160 carries out focus adjustment, distortion correction, zoom setting, lens shift adjustment, or projection of a test pattern, based on data about projection settings transmitted from the information processing device 200. The control unit 160 also controls the execution of each function, based on an operation instruction inputted via the operation panel 131.

The control unit 160 has a projection control unit 161 and a correction processing unit 163, as functional blocks. These functional blocks are implemented by the collaboration of the CPU and the control program stored in the ROM or the storage unit 170, none of which is illustrated.

The storage unit 170 is a non-volatile storage device and is implemented by a storage device such as a flash memory, EPROM (erasable programmable ROM), EEPROM (electrically EPROM), or HDD (hard disk drive). The storage unit 170 stores image data to be projected on the screen SC1 by the image projection unit 50, various data and parameters which the control unit 160 refers to, and image data of a test pattern or the like.

The projection control unit 161 adjusts the display form of an image by the image projection unit 50 and thus controls the projection of an image on the screen SC1.

Specifically, the projection control unit 161 controls the image processing unit 152 to execute image processing of image data received by the communication unit 175. In this case, the projection control unit 161 may read out from the storage unit 170 a necessary parameter for the processing by the image processing unit 152 and output the parameter to the image processing unit 152.

The projection control unit 161 also controls the light source drive unit 121 to switch on the light source of the light source unit 55 and designates a luminance of the light source of the light source unit 55.

The correction processing unit 163 executes correction processing based on state information outputted from the state detection unit 140.

For example, if the state information indicates that the projector 100A is tilted, the correction processing unit 163 instructs the image processing unit 152 to carry out correction.

Also, based on data about distortion correction of projection settings transmitted from the information processing device 200, the correction processing unit 163 instructs the image processing unit 152 to carry out correction.

A power supply unit 190 converts electric power supplied from an external power source 195 into a predetermined characteristic value and supplies the characteristic value to each functional unit.

Functional Configuration of Information Processing Device

Figure 3:
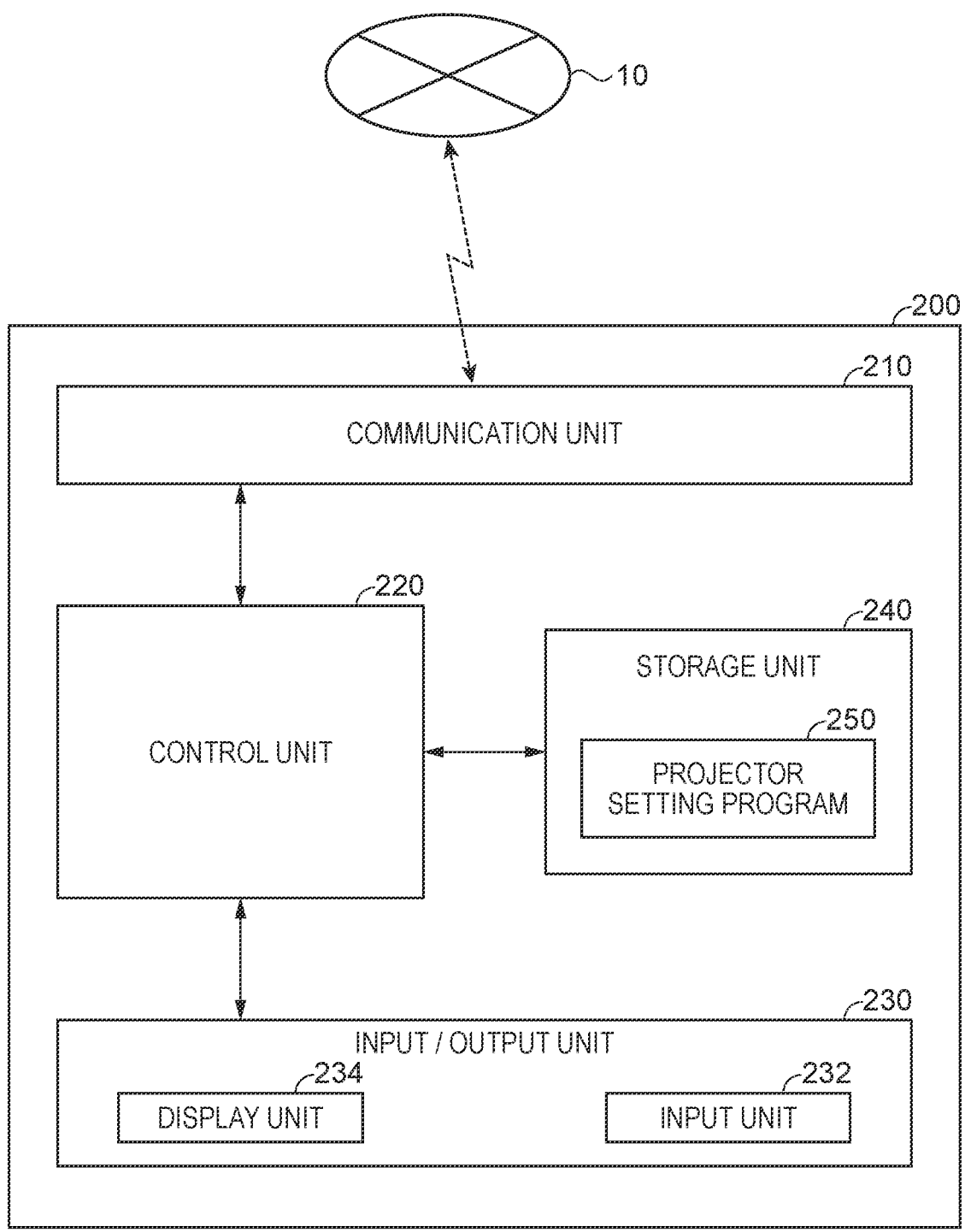
FIG. 3 shows the functional configuration of an information processing device.

FIG. 3 shows the functional configuration of the information processing device 200 connected to the projectors (100A, 100B, 100C). In the description below, the projector 100A is equivalent to a first display device and the projector 100B is equivalent to a second display device.

The information processing device 200 has a communication unit 210, a control unit 220, an input/output unit 230, and a storage unit 240.

In this embodiment, the information processing device 200 is assumed to be a laptop computer but not limited to this. For example, the information processing device 200 may be a small information terminal which the user holds in the hands to operate. The small information terminal is assumed to be, for example, a high-function mobile phone such as a smartphone, or a multi-function mobile terminal such as a tablet terminal or PDA (personal digital assistant).

The communication unit 210 transmits and receives data to and from the projectors (100A, 100B, 100C) via the network 10. For example, the communication unit 210 transmits image data to be projected by the projectors (100A, 100B, 100C) and data about projection settings of the projectors (100A, 100B, 100C).

The storage unit 240 stores content data in a file format representing an image or document, and data of a projector setting program 250 executable by the information processing device 200. The projector setting program 250 is equivalent to a control program and is an application program for providing projection settings of the connected projectors (100A, 100B, 100C). In this embodiment, the storage unit 240 is assumed to be, for example, a flash memory or the like.

The input/output unit 230 has a display unit 234 which displays a management screen (operation screen) for managing the connected projectors (100A, 100B, 100C), and an input unit 232 which accepts an operation on the operation screen. In this embodiment, the display unit 234 is assumed to be a liquid crystal panel. The display unit 234 displays, for example, an image of a user interface or the like of the currently executed projector setting program 250. The input unit 232 is assumed to be a touch panel, keyboard, mouse or the like integrated with the liquid crystal panel. The input unit 232 accepts, for example, an instruction by the user on the displayed user interface.

The control unit 220 has hardware including a processor such as a CPU (central processing unit), a ROM (read only memory, and a RAM (random access memory), none of which is illustrated. The ROM is a non-volatile storage device such as a flash ROM and stores a control program such as an operating system, and data. The RAM forms a work area for the processor.

The processor loads the control program readout from the ROM or the storage unit 240 into the RAM and executes the control program loaded in the RAM, thus implementing each functional unit of the information processing device 200 and comprehensively controlling operations of the information processing device 200. The control unit 220 also controls operations of the projectors (100A, 100B, 100C), based on an operation accepted by the input unit 232.

In this embodiment, the operating system is assumed to be Windows (trademark registered) but not limited to this. For example, Android (trademark registered) or iOS (trademark registered) is also conceivable.

The control unit 220 represents a functional configuration implemented by the collaboration of hardware and software and is not particularly limited to any specific installation form. Therefore, pieces of hardware corresponding individually to the respective functions need not necessarily be installed. Functions of a plurality of functional units can be implemented by a single processor executing a program. Also, a part of functions implemented by software may be implemented by hardware, and a part of functions implemented by hardware may be implemented by software.

Figure 4:
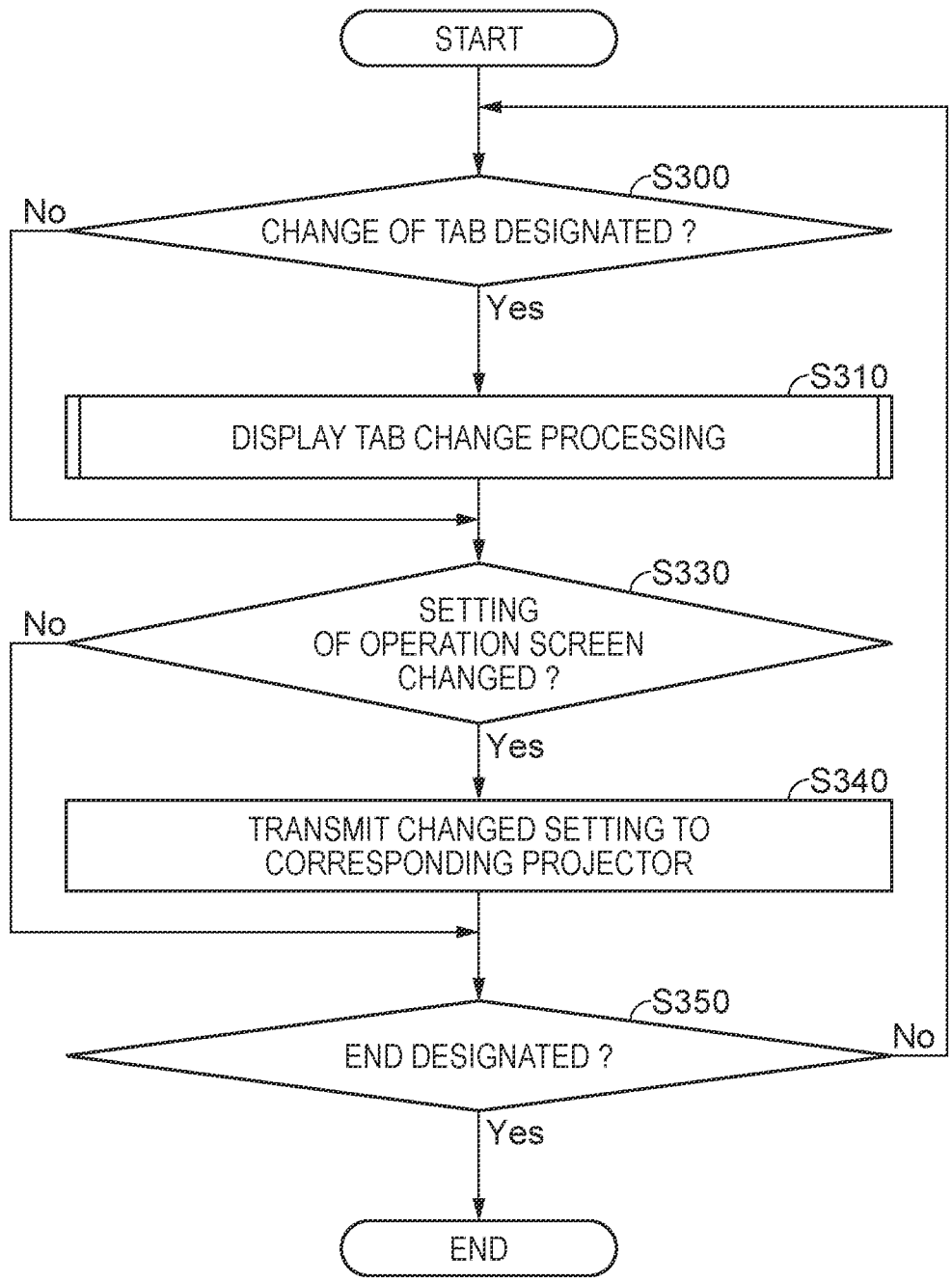
FIG. 4 is a flowchart showing a flow of processing of a projector setting program.
Figure 5:
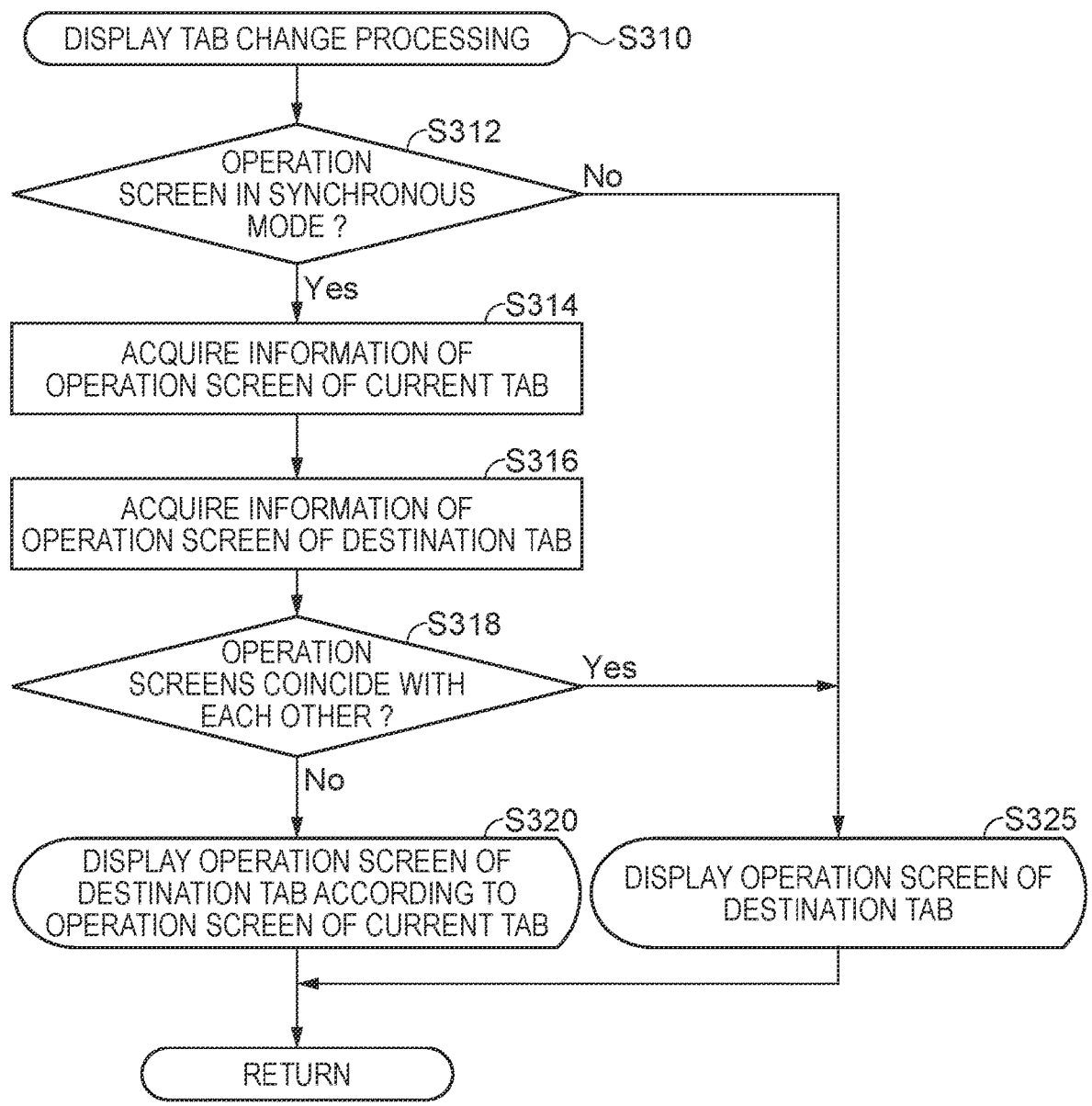
FIG. 5 is a flowchart showing details of display tab change processing.

FIG. 4 is a flowchart showing a flow of processing of the projector setting program 250 (control method). FIG. 5 is a flowchart showing details of display tab change processing S310. In the description below, an example of the operation screen is described with reference to FIGS. 6A to 6C and FIGS. 7A to 7C, where appropriate.

In this embodiment, it is assumed that the projector setting program 250 is executed in the information processing device 200 and that the projectors (100A, 100B, 100C) to be setting targets are designated. In this case, the operation screen (for example, FIGS. 7A to 7C) functioning as a user interface is prepared for each of the projectors (100A, 100B, 100C) and displayed on the information processing device 200 in such a way as to be switchable via a tab which is a component forming the user interface.

Figure 6A:
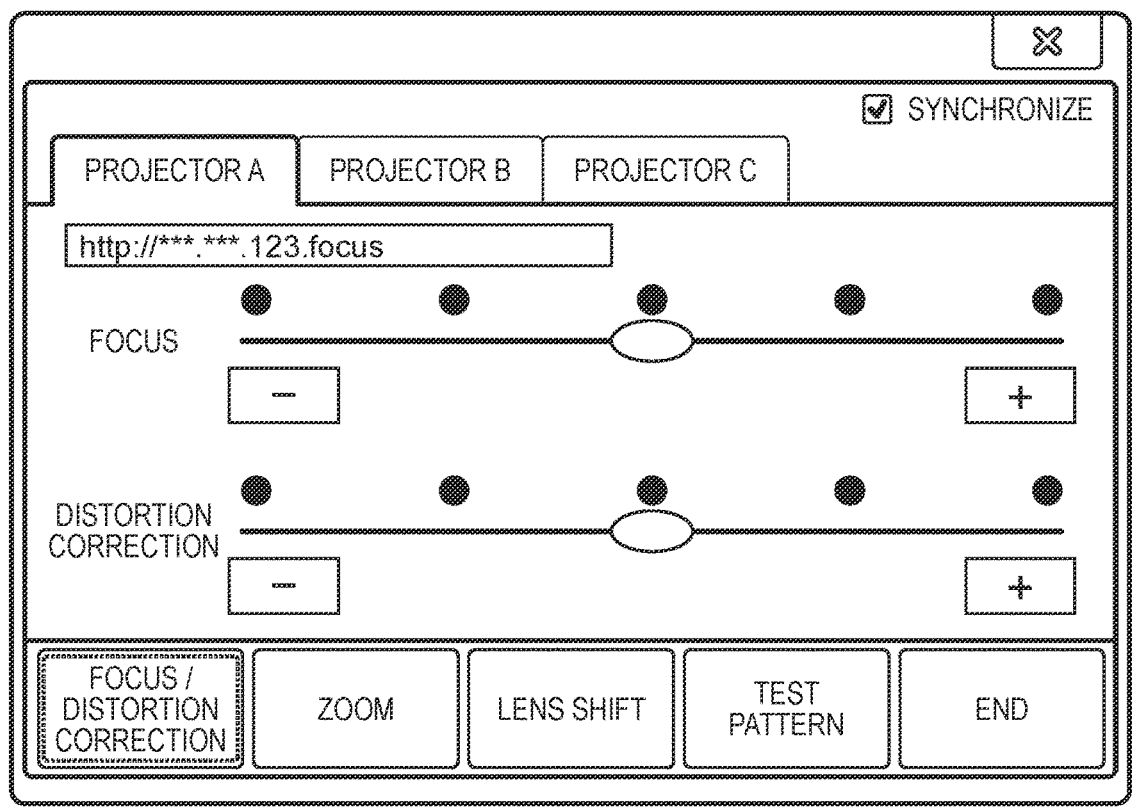
FIG. 6A shows an example of an operation screen.
Figure 7A:
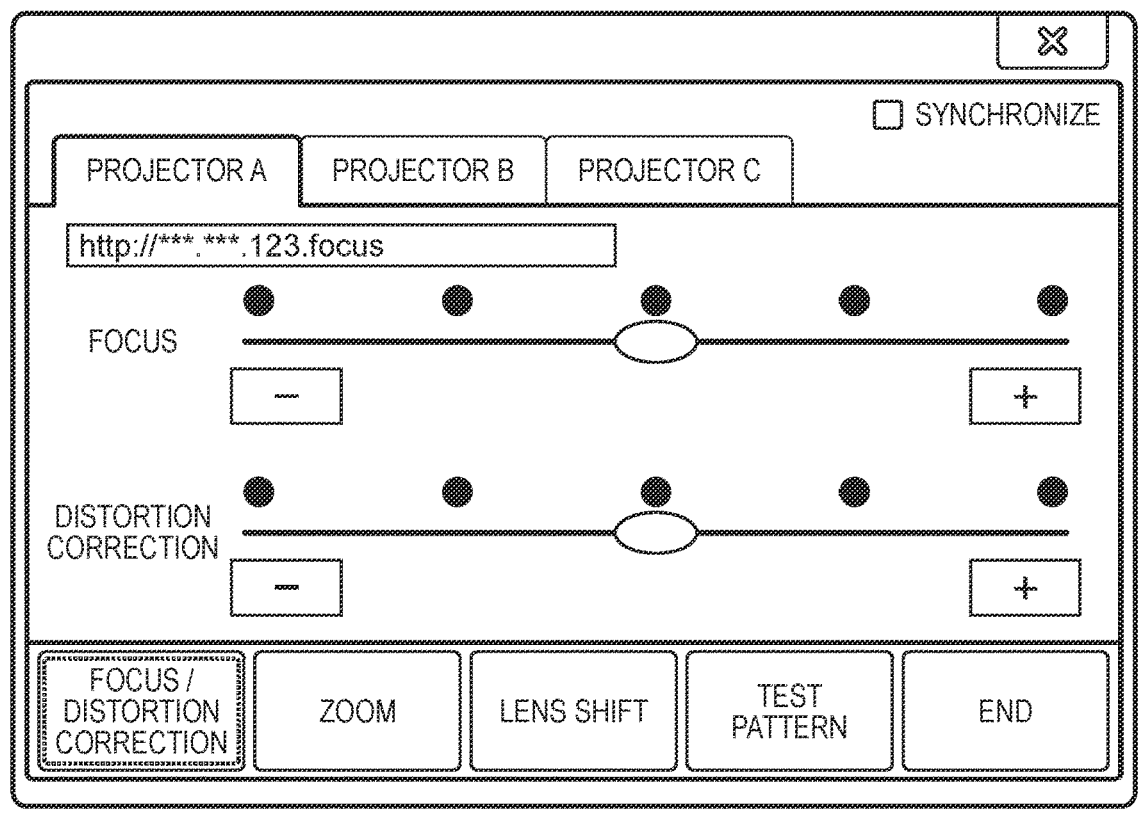
FIG. 7A shows an example of the operation screen.

As shown in FIG. 6A or FIG. 7A, in the current state, it is assumed that an operation screen (first management screen) for "projector A" referring to the projector 100A is displayed at the forefront and is in an operable state (first state). "Projector B" refers to the projector 100B. "Projector C" refers to the projector 100C.

In this state, the control unit 220 determines whether or not a change of the operation screen is designated by the user designating the tab of "projector B" or the tab of "projector C" (step S300). For example, if the tab of "projector B" is designated, the operation screen for "projector B" is displayed at the forefront and is turned into an operable state (second state).

Here, if it is determined that a change is designated (Yes in step S300), display tab change processing S310 is executed.

The display tab change processing S310 will now be described with reference to FIG. 5.

When the display tab change processing S310 is executed, first, the control unit 220 determines whether the operation screen is in a synchronous mode or not (step S312).

In this embodiment, a selection switch (setting switch) shown as "synchronize" is arranged at a top right part of the operation screen. The user selects this selection switch to switch on and off the synchronous mode. The selection switch shown as "synchronize" decides whether or not to use the same item screen showing a predetermined item before and after switching the operation screen.

If the "synchronize" box is checked as shown in FIG. 6A and it is determined that the operation screen is in the synchronous mode (Yes in step S312), the control unit 220 acquires information of the operation screen of the tab of "projector A", which is currently operable (step S314). For example, in FIG. 6A, the control unit 220 acquires information that the item screen showing a predetermined item on the operation screen of "projector A" is "focus/distortion correction".

Next, the control unit 220 acquires information about the operation screen of a destination tab to which focusing shifts (step S316). For example, if the user selects the tab of "projector B", the control unit 220 acquires information about the operation screen of "projector B", to which focusing shifts. The information to be acquired includes setting information of an item screen selected on the operation screen of "projector B" when the operation screen of "projector B" is displayed at the forefront and shifts to the operable state. In this case, the setting information represents one of "focus/distortion correction", "zoom", "lens shift", and "test pattern".

Next, the control unit 220 compares the current operation screen of "projector A" with the operation screen shown when the operation screen is changed to that of "projector B", and thus determines whether the two operation screens coincide with each other or not, that is, whether the two operation screens have the same item screen such as "focus/distortion correction" or not (step S318).

If it is determined that the two operation screens do not coincide with each other (No in step S318), the control unit 220 displays the operation screen of the destination tab according to the operation screen of the current tab (step S320), and ends step S310.

Figure 6B:
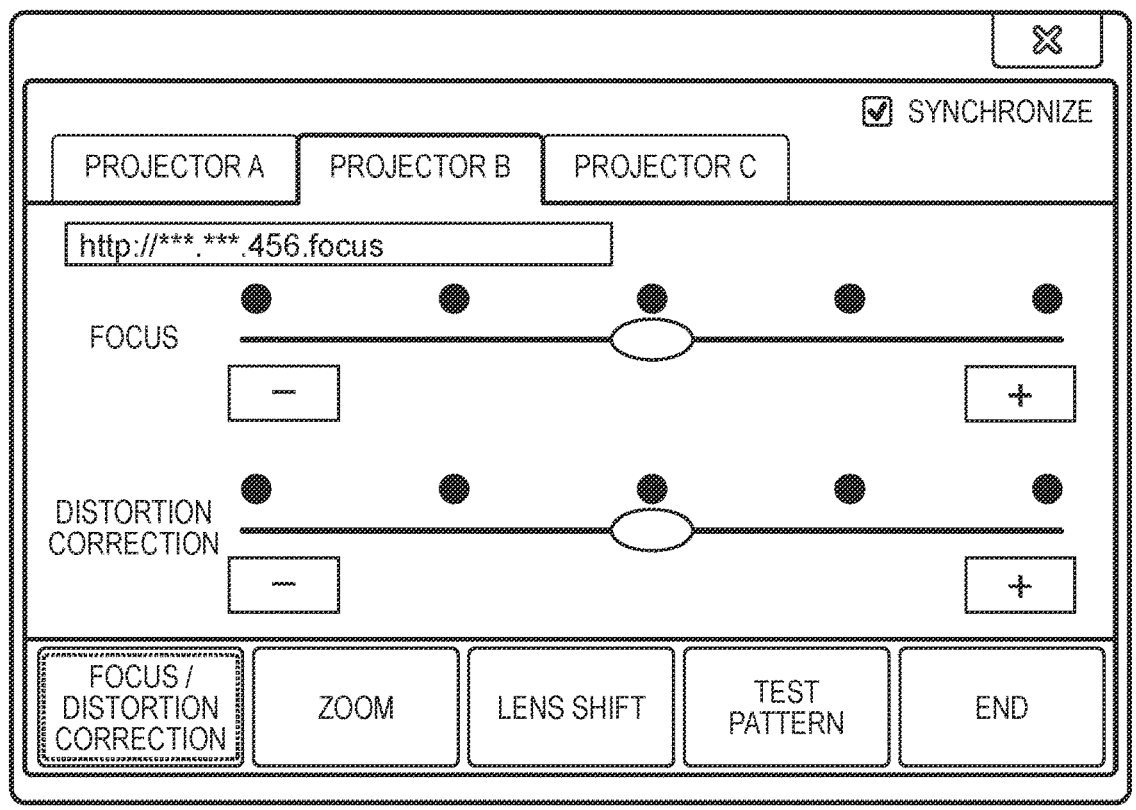
FIG. 6B shows an example of the operation screen.

For example, if the operation screen of "projector A" has the item screen of "focus/distortion correction" (first item screen), as shown in FIG. 6A, and the item screen of the destination "projector B" is "lens shift", which is different from "focus/distortion correction", the control unit 220 changes the setting information in such a way that the item screen of "projector B" changes to an item screen having an item corresponding to "focus/distortion correction" (in this embodiment, the same item screen as "focus/distortion correction" (second item screen)). The control unit 220 thus displays the operation screen of "projector B" at the forefront and shifts the operation screen into the operable second state. Thus, the operation screen (second management screen) of the "projector B" having the item screen of "focus/distortion correction" is displayed in an operable manner, as shown in FIG. 6B.

While the example of using the same item screen is described in this embodiment, this example is not limiting. The item screens may have the same function. For example, the item screen on the operation screen of "projector B" may be an item screen that is designed differently from the item screen of "focus/distortion correction" on the operation screen of "projector A" but enables "focus/distortion correction". In this embodiment, an address (URL (uniform resource locator)) on a website is allocated to each item screen of each of the projectors (100A, 100B, 100C), and the same file name is allocated as a folder name for each item screen. For example, the folder name for "focus/distortion correction" is "focus".

Therefore, when changing the setting information in such a way that the item screen of "projector B" changes to "focus/distortion correction", the control unit 220 edits the URL corresponding to the current item screen of "projector A". That is, the control unit 220 changes the folder name to "focus" and rewrites the path name of the projector 100A with the path name of the projector 100B. Thus, the item screen of the projector 100B can be set easily and swiftly.

While it is assumed in the embodiment that each item on an item screen to which a URL is allocated represents an initial state with an initial value (default value) set, this is not limiting. For example, with "focus/distortion correction", setting screens corresponding respectively to a plurality of set values in focus setting and distortion correction may be prepared, and a URL may be allocated to each of the prepared setting screens. In this case, the control unit 220 may select and display one of the plurality of setting screens, based on the setting states set for the projectors (100A, 100B, 100C).

Figure 6C:
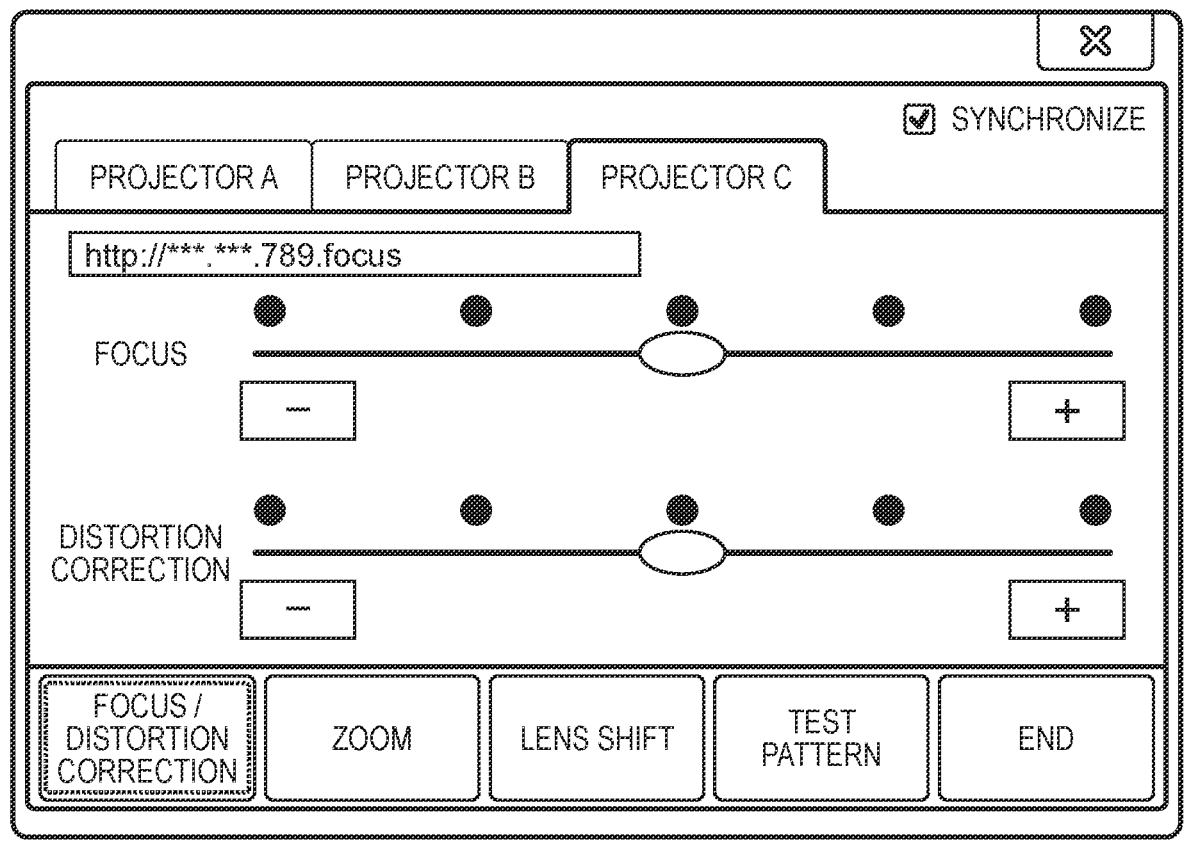
FIG. 6C shows an example of the operation screen.

If the user selects the tab of "projector C", the control unit 220 changes the operation screen of "projector C" to the item screen of "focus/distortion correction", displays the operation screen of "projector C" at the forefront, and shifts the operation screen to an operable state, as shown in FIG. 6C.

Meanwhile, if it is determined in step S318 that the two operation screens coincide with each other (Yes), the control unit 220 displays the operation screen of the destination tab (step S325) and ends step S310.

For example, if the current operation screen of "projector A" has the item screen of "focus/distortion correction" as shown in FIG. 6A, the item screen of the destination "projector B" is the item screen of "focus distortion" and is therefore displayed as shown in FIG. 6B. Similarly, the item screen of the destination "projector C" is the item screen of "focus/distortion correction" and is therefore displayed as shown in FIG. 6C.

If it is determined in step S312 that the operation screen is not in the synchronous mode as shown in FIG. 7A (No), the control unit 220 displays the operation screen of the destination tab (step S325) and ends step S310.

Figure 7B:
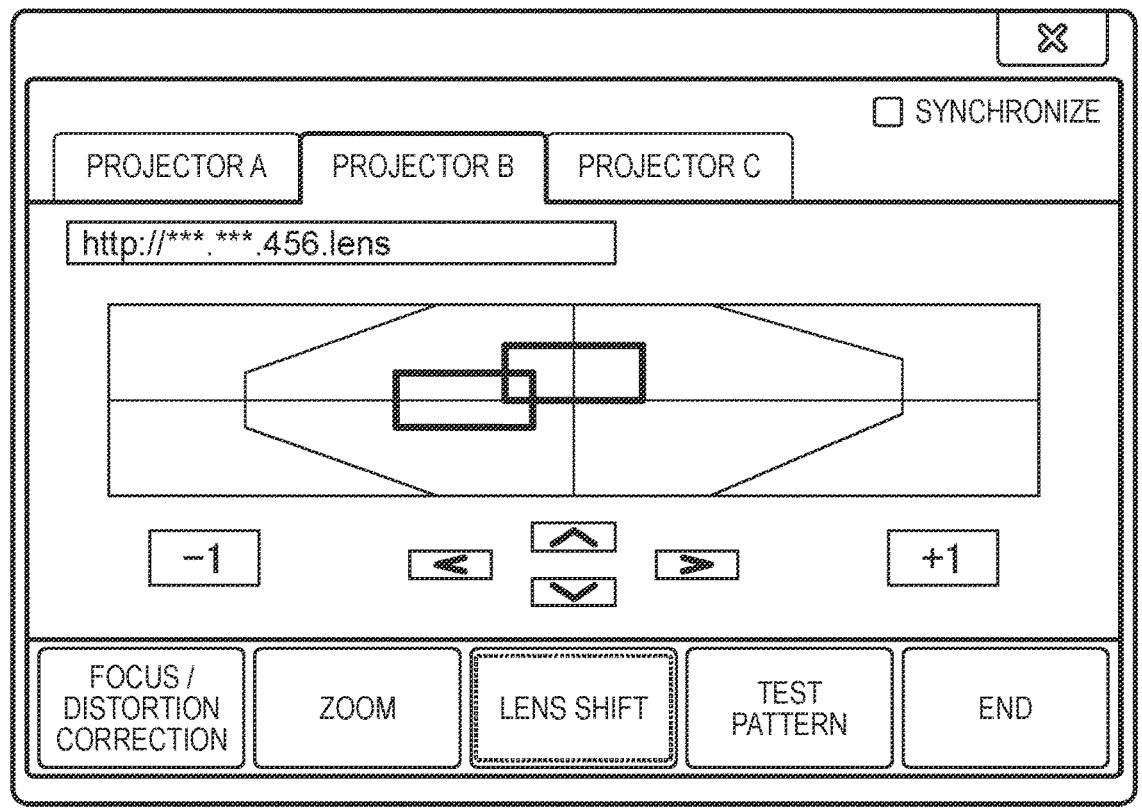
FIG. 7B shows an example of the operation screen.
Figure 7C:
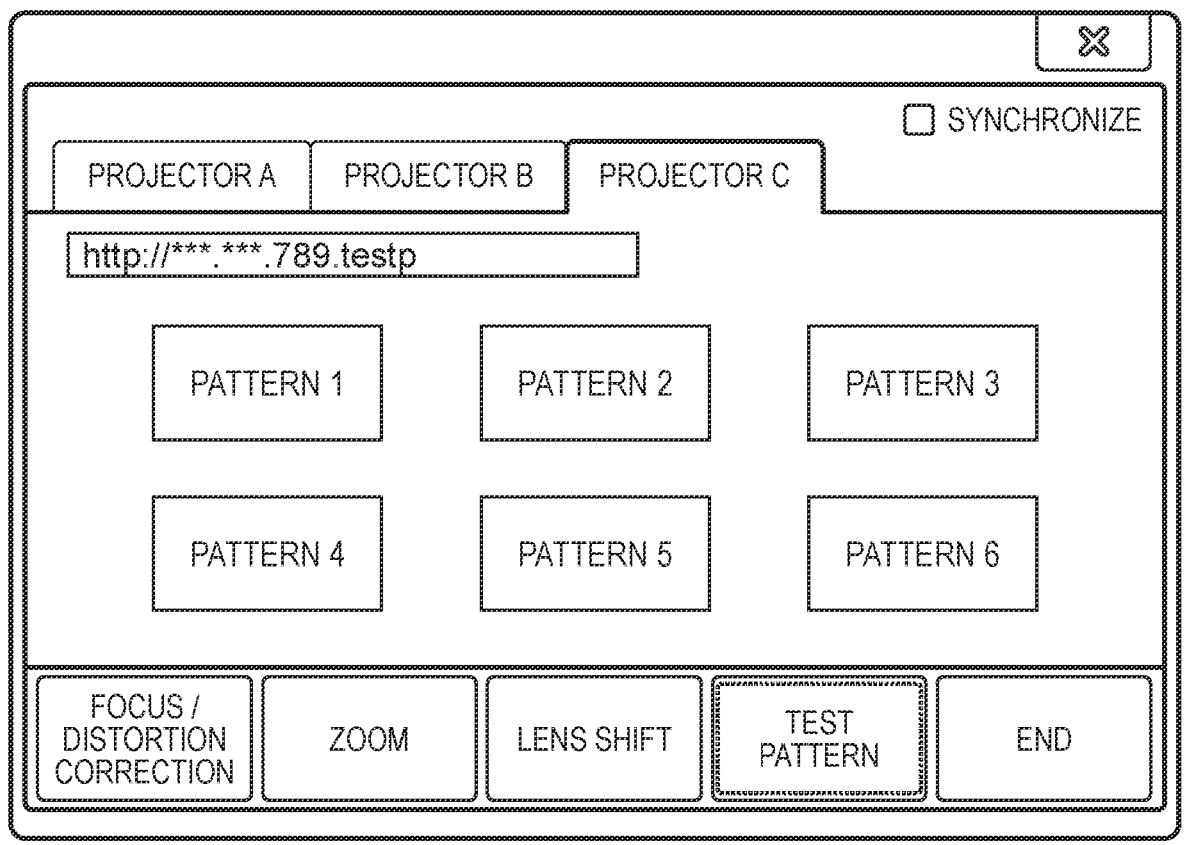
FIG. 7C shows an example of the operation screen.

In this case, even if the current operation screen of "projector A" has the item screen of "focus/distortion correction", the item screen of the destination "projector B" is the item screen of "lens shift" displayed based on the setting information, as shown in FIG. 7B. Similarly, the item screen of the destination "projector C" is the item screen of "test pattern" displayed based on the setting information, as shown in FIG. 7C.

As described above, when changing the operable operation screen from the projector 100A to the projector 100B while synchronizing the operation screens, the control unit 220 performs control so that an item corresponding to a predetermined item selected on the operation screen of the projector 100A is displayed also on the operation screen of the projector 100B when the projector 100A is in the operable state. That is, when the first item screen is selected in an operable manner on the operation screen of the projector 100A, the control unit 220 selects and displays the second item screen having the same item as the first item screen in an operable manner on the operation screen of the projector 100B.

Back to FIG. 4, after the display tab change processing S310 ends, step S330 is executed.

Also, step S330 is executed if it is determined in step S300 that a change is not designated (No in step S300).

In step S330, the control unit 220 determines whether the setting of the operation screen is changed or not.

If it is determined that the setting of the operation screen is changed (Yes in step S330), the control unit 220 transmits the changed setting to the corresponding projector (100A, 100B, 100C) (step S340) and proceeds to step S350.

Meanwhile, if it is determined that the setting of the operation screen is not changed (No in step S330), the control unit 220 proceeds to step S350.

In step S350, the control unit 220 determines whether an end is designated or not. If it is determined that an end is designated (Yes), the control unit 220 ends the processing.

Meanwhile, if it is determined that an end is not designated (No in step S350), the control unit 220 returns to the beginning (step S300) of the processing of the projector setting program 250 and repeats the above processing.

The foregoing embodiment has the following effects.

(1) When the operation state is switched from the first state, where the operation screen of "projector A" can be operated, to the second state, where the operation screen of "projector B" can be operated, in response to an operation by the user, the operation screen of "projector B" where the item screen corresponding to the item screen selected on the operation screen of "projector A" in the first state is selected is displayed in the second state. Since the item screen corresponding to the item screen selected on the operation screen of "projector A" is selected on the operation screen of "projector B", the predetermined item can be swiftly managed for the projector 100A and the projector 100B. This improves convenience in managing the projectors 100A, 100B.

(2) When the operation state is switched from the first state, where the operation screen of "projector A" can be operated, to the second state, where the operation screen of "projector B" can be operated, the operation screen of "projector B" where the same item screen as the item screen selected on the operation screen of "projector A" in the first state is displayed in the second state. Thus, when the projectors 100A, 100B to be managed are switched, the same operation screen is displayed. This saves the time and effort of selecting an operation screen every time the projectors 100A, 100B are switched.

(3) When the operation state is switched from the first state, where the operation screen of "projector A" can be operated, to the second state, where the operation screen of "projector B" can be operated, the operation screen of "projector B" can be displayed with its item screen changed to the same item screen as the item screen on the operation screen of "projector A", or the operation screen of "projector B" can be displayed without changing the item screen selected thereon, according to the selection switch.

Although the invention is described, based on the illustrated embodiment, the invention is not limited to this embodiment. The following modifications are conceivable.

(1) The projectors (100A, 100B, 100C) are not limited to the configuration using a liquid crystal light valve as the light modulation unit 80 and can employ other configurations such as DLP (digital light processing) and LCOS (liquid crystal on screen).

(2) The display device is not limited to the projectors (100A, 100B, 100C). For example, a direct-view display device such as a liquid crystal display, organic EL display, or head-mounted display may be employed.

What is claimed is:

1. A control device that controls a first display device and a second display device, the control device comprising:
   a display panel; and
   a processor programmed to execute:
     displaying, on the display panel, a first item screen used for accepting an operation for setting a first item of a first display device, the first item being a projection setting for controlling at least one of a light source, a light valve, and a projection system, the displaying the first item screen including:
       not displaying a second item screen used for accepting an operation for setting the first item of the second display device;
       not displaying a third item screen used for accepting an operation for setting a second item of the first display device, the second item being a projection setting for controlling at least one of the light source, the light valve and the projection system different from the first item; and
       not displaying a fourth item screen used for accepting an operation for setting the second item of the second display device;
     displaying, on the display panel, the second item screen when an operation of selecting the second display device is received during the displaying the first item screen, the displaying the second item screen including:
       not displaying the first item screen;
       not displaying the third item screen; and
       not displaying the fourth item screen;
     displaying, on the display panel, the third item screen, the displaying the third item screen including:
       not displaying the first item screen;
       not displaying the second item screen; and
       not displaying the fourth item screen; and
     displaying, on the display panel, the fourth item screen when the operation of selecting the second display device is received during the displaying the third item screen, the displaying the fourth item screen including:
       not displaying the first item screen;
       not displaying the second item screen; and
       not displaying the third item screen.

2. The control device according to claim 1, wherein the processor is further programmed to execute:
   displaying, on the display panel, the third item screen when an operation of selecting the first display device is received during the displaying the fourth item screen; and displaying, on the display panel, the first item screen when the operation of selecting the first display device is received during the displaying the second item screen.

3. The control device according to claim 1, wherein the processor is further programmed to execute:
displaying, on the display panel, the third item screen when an operation of selecting the second item is received during the displaying the first item screen; and
displaying, on the display panel, the fourth item screen when the operation of selecting the second item is received during the displaying the second item screen.

4. The control device according to claim 1, wherein the processor is further programmed to execute:
displaying, on the display panel, a fifth item screen used for accepting an operation for setting a third item of the first display device, the third item being a projection setting for controlling at least one of the light source, the light valve, and the projection system different from the first item and the second item, the displaying the fifth item screen including:
not displaying the second item screen;
not displaying the third item screen;
not displaying the fourth item screen; and
not displaying a sixth item screen used for accepting an operation for setting the third item of the second display device; and
displaying, on the display panel, the sixth item screen when the operation of selecting the second display device is received during the displaying the fifth item screen, the displaying the sixth item screen including:
not displaying the first item screen;
not displaying the third item screen;
not displaying the fourth item screen; and
not displaying the fifth item screen.

5. The control device according to claim 1, wherein the first item screen includes a third item of the first display device, the third item being one of a projection setting for controlling at least one of the light source, the light valve, and the projection system different from the first item and the second item.

6. The control device according to claim 1, wherein the processor is further programmed to execute:
displaying, on the display panel, a fifth item screen used for accepting an operation for setting a third item of the first display device and an operation for setting a fourth item of the first display device, the third item being a projection setting for controlling at least one of the light source, the light valve, and the projection system different from the first item, the second item and the fourth item, and the fourth item being a projection setting for controlling at least one of the light source, the light valve, and the projection system different from the first item, the second item and the third item.

7. The control device according to claim 1, wherein the first item is lens shift adjustment.

8. The control device according to claim 1, wherein the first item is test pattern.

9. The control device according to claim 1, wherein the first item is zoom setting.

10. The control device according to claim 1, wherein the first item is distortion correction.

11. The control device according to claim 1, wherein the first item is focus adjustment.

12. A control method comprising:
displaying a first item screen used for accepting an operation for setting a first item of a first display device, the first item being a projection setting for controlling at least one of a light source, a light valve, and a projection system, the displaying the first item screen including:
not displaying a second item screen used for accepting an operation for setting the first item of a second display device;
not displaying a third item screen used for accepting an operation for setting a second item of the first display device, the second item being a projection setting for controlling at least one of the light source, the light valve, and the projection system different from the first item; and
not displaying a fourth item screen used for accepting an operation for setting the second item of the second display device;
displaying the second item screen when an operation of selecting the second display device is received during the displaying the first item screen, the displaying the second item screen including:
not displaying the first item screen;
not displaying the third item screen; and
not displaying the fourth item screen;
displaying the third item screen, the displaying the third item screen including:
not displaying the first item screen;
not displaying the second item screen; and
not displaying the fourth item screen; and
displaying the fourth item screen when the operation of selecting the second display device is received during the displaying the third item screen, the displaying the fourth item screen including:
not displaying the first item screen;
not displaying the second item screen; and
not displaying the third item screen.

13. The control method according to claim 12, further comprising:
displaying the third item screen when an operation of selecting the first display device is received during the displaying the fourth item screen; and
displaying the first item screen when the operation of selecting the first display device is received during the display of the second item screen.

14. The control method according to claim 12, further comprising:
displaying the third item screen when an operation of selecting the second item is received during the displaying the first item screen; and
displaying the fourth item screen when the operation of selecting the second item is received during the displaying the second item screen.

15. The control method according to claim 12, further comprising:
displaying a fifth item screen used for accepting an operation for setting a third item of the first display device, the third item being a projection setting for controlling at least one of the light source, the light valve, and the projection system different from the first item and the second item, the displaying the fifth item screen including:
not displaying the second item screen;
not displaying the third item screen;
not displaying the fourth item screen; and
not displaying a sixth item screen used for accepting an operation for setting the third item of the second display device; and displaying the sixth item screen when the operation of selecting the second display device is received during the displaying the fifth item screen, the displaying the sixth item screen including:
not displaying the first item screen;
not displaying the third item screen;
not displaying the fourth item screen; and
not displaying the fifth item screen.

16. The control method according to claim 12, wherein the first item screen including a third item of the first device, the third item being a projection setting for controlling at least one of the light source, the light valve, and the projection system different from the first item and the second item.

17. The control method according to claim 12, further comprising:
displaying a fifth item screen used for accepting an operation for setting a third item of the first display device and an operation for setting a fourth item of the first display device, the third item being a projection setting for controlling at least one of the light source, the light valve, and the projection system different from the first item, the second item and the fourth item, the fourth item being a projection setting for controlling at least one of the light source, the light valve, and the projection system different from the first item, the second item and the third item.

18. The control method according to claim 12, wherein the first item is lens shift adjustment.

19. The control method according to claim 12, wherein the first item is test pattern.

20. The control method according to claim 12, wherein the first item is zoom setting.

21. The control method according to claim 12, wherein the first item is distortion correction.

22. The control method according to claim 12, wherein the first item is focus adjustment.

* * * * *